United States Patent
Kim et al.

(10) Patent No.: US 11,197,223 B2
(45) Date of Patent: Dec. 7, 2021

(54) METHOD AND APPARATUS FOR DETERMINING TRANSMISSION PATH OF PACKET IN WIRELESS COMMUNICATION

(71) Applicant: Samsung Electronics Co., Ltd., Suwon-si (KR)

(72) Inventors: Dongsook Kim, Suwon-si (KR); Dongho Kwak, Suwon-si (KR); Hoon Huh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/874,157

(22) Filed: May 14, 2020

(65) Prior Publication Data

US 2020/0367132 A1    Nov. 19, 2020

(30) Foreign Application Priority Data

May 17, 2019    (KR) ........................ 10-2019-0058408

(51) Int. Cl.
*H04W 40/04* (2009.01)
*H04W 76/15* (2018.01)
*H04W 80/06* (2009.01)
*H04W 80/08* (2009.01)

(52) U.S. Cl.
CPC ........... *H04W 40/04* (2013.01); *H04W 76/15* (2018.02); *H04W 80/06* (2013.01); *H04W 80/08* (2013.01)

(58) Field of Classification Search
None
See application file for complete search history.

(56) References Cited

U.S. PATENT DOCUMENTS

| | | | |
|---|---|---|---|
| 2014/0362704 A1* | 12/2014 | Jha | H04L 5/14 370/237 |
| 2015/0098379 A1 | 4/2015 | Lunden et al. | |
| 2015/0124743 A1 | 5/2015 | Damnjanovic et al. | |
| 2015/0195867 A1 | 7/2015 | Koc et al. | |
| 2015/0215912 A1 | 7/2015 | Jha et al. | |
| 2015/0223089 A1 | 8/2015 | Chakraborty et al. | |
| 2015/0326371 A1 | 11/2015 | Baek et al. | |
| 2015/0327249 A1 | 11/2015 | Kitazoe et al. | |

(Continued)

FOREIGN PATENT DOCUMENTS

WO    2015/060544 A1    4/2015

OTHER PUBLICATIONS

European Search Report dated Nov. 4, 2020; European Appln. No. 20174608.8-1231 / 3745810.

*Primary Examiner* — Diane L Lo
(74) *Attorney, Agent, or Firm* — Jefferson IP Law, LLP

(57) ABSTRACT

A communication method and system for converging a $5^{th}$-Generation (5G) communication system for supporting higher data rates beyond a $4^{th}$-Generation (4G) system with a technology for Internet of Things (IoT) is provided. The disclosure may be applied to intelligent services based on the 5G communication technology and the IoT-related technology, such as smart home, smart building, smart city, smart car, connected car, health care, digital education, smart retail, security and safety services. The disclosure proposes a transmission path determination method and apparatus for latency reduction.

16 Claims, 14 Drawing Sheets

(56) References Cited

U.S. PATENT DOCUMENTS

| | | |
|---|---|---|
| 2015/0327280 A1 | 11/2015 | Zhang et al. |
| 2015/0327322 A1 | 11/2015 | Huang et al. |
| 2016/0014691 A1 | 1/2016 | Rastogi |
| 2016/0073345 A1 | 3/2016 | Fan et al. |
| 2016/0081020 A1 | 3/2016 | Rahman et al. |
| 2016/0128046 A1 | 5/2016 | Sebire et al. |
| 2016/0192433 A1 | 6/2016 | Deenoo et al. |
| 2016/0212711 A1 | 7/2016 | Yi |
| 2016/0219475 A1 | 7/2016 | Kim |
| 2016/0249405 A1 | 8/2016 | Koc et al. |
| 2016/0255583 A1 | 9/2016 | Takeda et al. |
| 2016/0255619 A1* | 9/2016 | Yi .................. H04W 72/0413 370/252 |
| 2016/0269931 A1* | 9/2016 | Dinan .................. H04W 24/10 |
| 2017/0041983 A1 | 2/2017 | Jha et al. |
| 2017/0111928 A1 | 4/2017 | Song et al. |
| 2017/0111956 A1 | 4/2017 | Koc et al. |
| 2017/0303151 A1 | 10/2017 | Lunden et al. |
| 2017/0367045 A1 | 12/2017 | Rahman et al. |
| 2018/0020503 A1 | 1/2018 | Deenoo et al. |
| 2018/0077596 A1 | 3/2018 | Huang et al. |
| 2018/0227946 A1 | 8/2018 | Song et al. |
| 2018/0249463 A1 | 8/2018 | Huang et al. |
| 2018/0279403 A1 | 9/2018 | Kim |
| 2018/0279406 A1* | 9/2018 | Agarwal .............. H04W 76/27 |
| 2018/0302867 A1 | 10/2018 | Abedini et al. |
| 2018/0352603 A1 | 12/2018 | Jha et al. |
| 2018/0367230 A1 | 12/2018 | Su et al. |

\* cited by examiner

FIG. 4
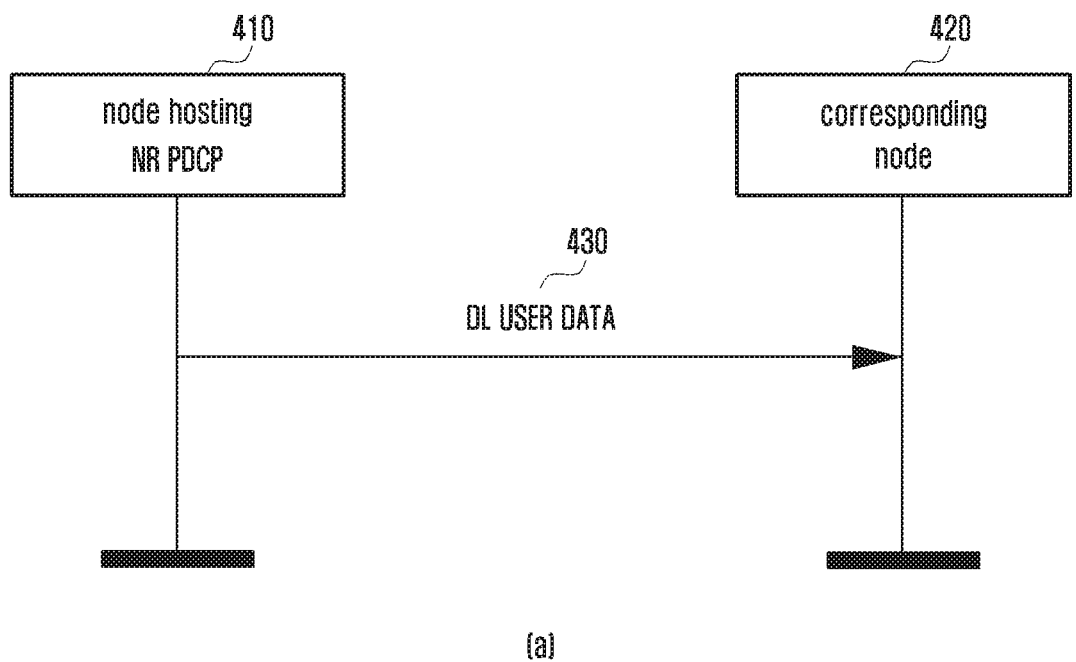
(a)
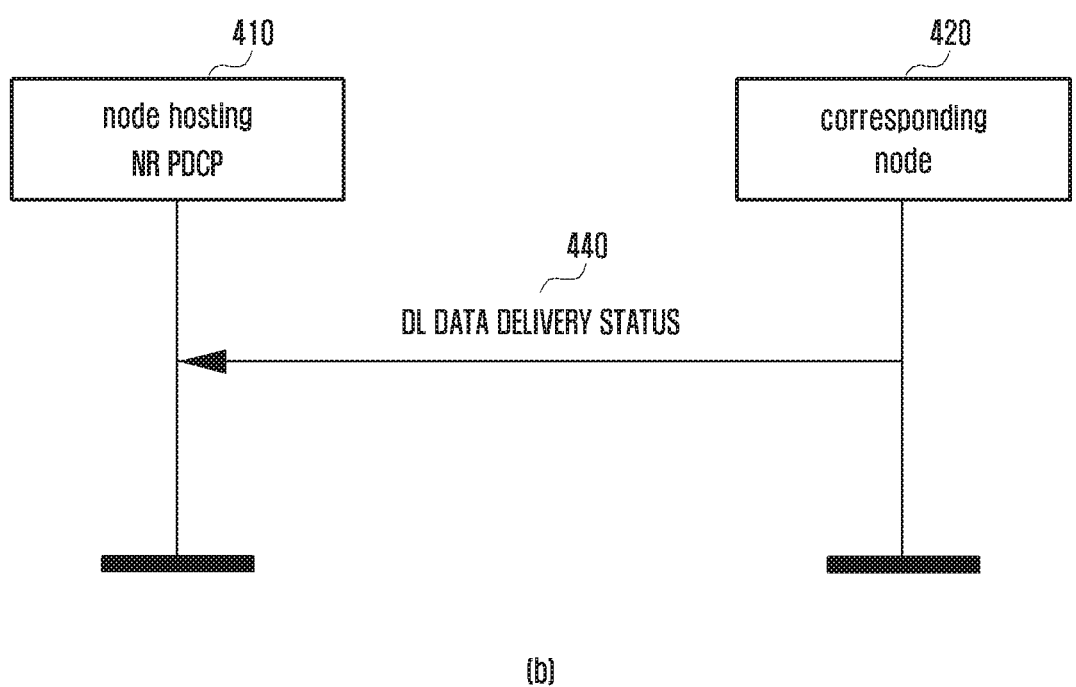
(b)

METHOD AND APPARATUS FOR DETERMINING TRANSMISSION PATH OF PACKET IN WIRELESS COMMUNICATION

CROSS-REFERENCE TO RELATED APPLICATION(S)

This application is based on and claims priority under 35 U.S.C. § 119(a) of a Korean patent application number 10-2019-0058408, filed on May 17, 2019, in the Korean Intellectual Property Office, the disclosure of which is incorporated by reference herein in its entirety.

BACKGROUND

1. Field

The disclosure relates to a wireless communication system. More particularly, the disclosure relates to a transmission path determination method and apparatus for latency reduction in a wireless communication system. More specifically, the disclosure relates to a transmission path determination method and apparatus for reduction of latency that may occur in transmission or reception of a packet in an environment in which dual connectivity (DC) is configured for a terminal.

2. Description of Related Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post LTE System'.

The 5G communication system is considered to be implemented in higher frequency (millimeter (mm) Wave) bands, e.g., 60 gigahertz (GHz) bands, so as to accomplish higher data rates. To decrease propagation loss of the radio waves and increase the transmission distance, beamforming, massive multiple-input multiple-output (MIMO), Full Dimensional MIMO (FD-MIMO), array antenna, analog beam forming, and other large-scale antenna techniques are discussed in 5G communication systems.

In addition, in 5G communication systems, development for system network improvement is underway based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation, and the like. In the 5G system, Hybrid FSK and QAM Modulation (FQAM) and sliding window superposition coding (SWSC) as an advanced coding modulation (ACM), and filter bank multi-carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine-Type Communication (MTC), and so forth have been recently researched. Such an IoT environment may provide intelligent Internet technology services that create new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine-Type Communication (MTC), and Machine-to-Machine (M2M) communication may be implemented by beamforming, MIMO, and array antennas. Application of a cloud Radio Access Network (RAN) as the above-described Big Data processing technology may also be considered an example of convergence between the 5G technology and the IoT technology.

Recently, with the development of communication systems, various research has been conducted on a dual-connectivity (DC) scenario. Particularly, in a new radio (NR) system, reducing the transmission latency of a data packet is an important issue, and thus, in the DC scenario, the need to reduce transmission latency has emerged.

The above information is presented as background information only, and to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages, and to provide at least the advantages described below. Accordingly, an aspect of the disclosure is to provide an apparatus and method to solve the problems mentioned above, and propose a method for preventing transmission latency of a data packet from being increased in the case where a split bearer is configured for a terminal through DC.

Another aspect of the disclosure is to provide a method for reducing power consumption by a terminal operating in a discontinuous reception (DRX) mode by efficiently selecting a transmission or reception path of data packets transmitted or received through a split bearer.

Another aspect of the disclosure is to improve a transmission or reception process while minimizing changes in the operation of a transmitting terminal and a receiving terminal according to a standard document.

Additional aspects will be set forth in part in the description which follows and, in part, will be apparent from the description, or may be learned by practice of the presented embodiments.

The technical problems to be solved by the disclosure are not limited to the matters mentioned above, and another technical problem that is not mentioned above will be sufficiently apparent to those skilled in the art from the embodiments to be described below.

In accordance with an aspect of the disclosure, a method by a base station is provided. The method includes receiving an uplink packet from a terminal, selecting, as a path for transmitting a downlink packet, a path via which the uplink packet is received among a plurality of paths configured for the terminal, and transmitting the downlink packet to the terminal through the selected path.

In accordance with another aspect of the disclosure, a plurality of paths is provided. The plurality of paths includes a first path including a master node (MN) of dual connectivity (DC), configured for the terminal, and a second path including a secondary node (SN) of the dual connectivity.

In accordance with another aspect of the disclosure, the downlink packet may be transmitted from a host node of a packet data convergence protocol (PDCP) supporting a split bearer to the terminal through a corresponding node of the selected path.

In accordance with another aspect of the disclosure, the uplink packet and the downlink packet may configure a pair of packets. The packets include at least one of a ping request packet, a ping response packet, a transmission control protocol (TCP) 3-way handshake packet, and a stop-and-wait protocol packet.

In accordance with another aspect of the disclosure, the method includes configuring a flag for path selection if the uplink packet is received, selecting the path based on a value of the flag, and reconfiguring the value of the flag if the downlink packet is transmitted.

In accordance with another aspect of the disclosure, a base station is provided. The base station includes a transceiver configured to transmit or receive a signal, and at least one processor configured to receive an uplink packet from a terminal, select, as a path for transmitting a downlink packet, a path via which the uplink packet is received among a plurality of paths configured for the terminal, and transmit the downlink packet to the terminal through the selected path.

In accordance with another aspect of the disclosure, a method by a terminal is provided. The method includes receiving a downlink packet from a base station, selecting, as a path for transmitting an uplink packet, a path via which the downlink packet is received among a plurality of paths configured for a terminal, and transmitting the uplink packet to the base station through the selected path.

In accordance with another aspect of the disclosure, a terminal is provided. The terminal includes a transceiver configured to transmit or receive a signal, and at least one processor configured to receive a downlink packet from a base station, select, as a path for transmitting an uplink packet, a path via which the downlink packet is received among a plurality of paths configured in a terminal, and transmit the uplink packet to the base station through the selected path.

In accordance with another aspect of the disclosure, in the case where data is transmitted or received through a split bearer for a terminal for which DC is configured, transmission latency of a data packet can be prevented in advance.

In accordance with another aspect of the disclosure, selection of a transmission path of a data packet is efficiently performed, and thus the amount of power consumed for monitoring of a control channel of a terminal operating in a DRX mode can be effectively reduced.

In accordance with another aspect of the disclosure, performance is improved while minimizing influence on the operation of a terminal and a base station, and thus the transmission or reception procedure can be improved without increasing the burden for implementation.

The effects obtainable from the embodiments are not limited to the effects mentioned above, and other effects, which are not mentioned, can be clearly derived and understood from the following embodiments.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 4 views (a) and (b) illustrate signaling between nodes configuring DC according to an embodiment of the disclosure;

Throughout the drawings, like reference numerals will be understood to refer to like parts, components, and structures.

DETAILED DESCRIPTION

Figure 1:
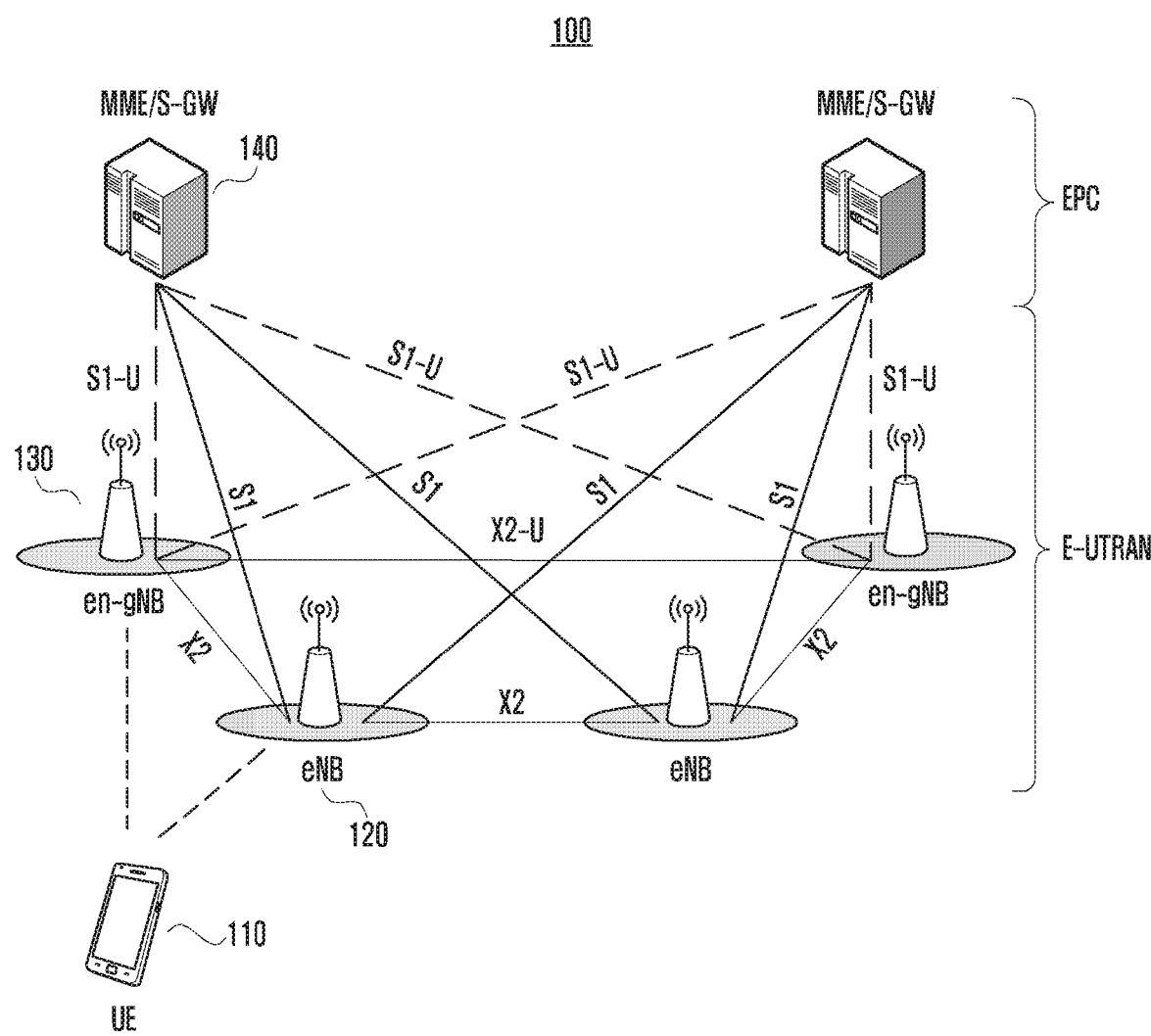
FIG. 1 illustrates DC according to an embodiment of the disclosure.

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used to enable a clear and consistent understanding of the disclosure. Accordingly, it should be apparent to those skilled in the art that the following description of various embodiments of the disclosure is provided for illustration purpose only, and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Here, it will be understood that each block of the flowchart illustrations, and combinations of blocks in the flowchart illustrations, can be implemented by computer program instructions, such as non-transitory computer programs. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operations to be performed on the computer or other programmable apparatus to produce a computer implemented process such that the instructions that execute on the computer or other programmable apparatus provide operations for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order shown. For example, two blocks shown in succession may in fact be executed substantially concurrently, or the blocks may sometimes be executed in reverse order, depending upon the functionality involved.

As used herein, "unit" refers to a software element, a hardware element, or combination thereof, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" may be implemented to reproduce one or more CPUs within a device or a security multimedia card.

Hereinafter, embodiments of the disclosure will be described in detail with reference to the accompanying drawings. For convenience of explanation, some terms and names which are defined in the 3rd-generation partnership project (3GPP), long-term evolution (LTE), LTE advanced (LTE-A), 5th generation (5G), and new radio (NR) standards may be used. However, the details of the disclosure are not limited by the terms and names according to the standards, and may be equally applied to systems according to other standards.

Hereinafter, a terminal may include a user equipment (UE), a mobile station (MS), a cellular phone, a smart phone, a computer, or a multimedia system capable of performing a communication function. In addition, hereinafter, a base station may include an evolved Node B (eNB), a next generation Node B (gNB), a Node B, a radio access unit, a transmission and reception point (TRP), or a node.

The wireless communication system, which has provided voice-oriented services in early stages, has evolved into a broadband wireless communication system that provides high-speed and high-quality packet data services according to communication standards such as high-speed packet access (HSPA) of 3GPP, LTE (or evolved universal terrestrial radio access (E-UTRA)), LTE-A, LTE-Pro, high-rate packet data (HRPD) of 3GPP2, ultra-mobile broadband (UMB), and IEEE 802.16e.

In the NR system, which is a representative example of a broadband wireless communication system, downlink (DL) adopts an orthogonal frequency-division multiplexing (OFDM) scheme, and uplink (UL) adopts a single-carrier frequency-division multiple access (SC-FDMA) scheme or a discrete Fourier transform spread OFDM (DFT-S-OFDM) scheme. The uplink refers to a radio link through which a terminal transmits data or a control signal to a base station, and the downlink refers to a radio link through which a base station transmits data or a control signal to a terminal. In the multiple access scheme described above, data of respective users or control information is distinguished from each other by performing allocation and operations such that time-frequency resources for carrying the data or control information for each terminal do not overlap each other, that is, such that orthogonality is established.

Since a 5G communication system needs to freely reflect the various requirements of a user, a service provider, and the like, services satisfying the various requirements need to be supported. Services being considered for the 5G communication system include enhanced mobile broadband (eMBB) communication, massive machine-type communication (mMTC), ultra-reliable low-latency communication (URLLC), and the like.

The eMBB aims to provide a further improved data transfer rate than the data rate supported by the legacy LTE, LTE-A, or LTE-Pro. For example, in the 5G communication system, the eMBB needs to support, from the viewpoint of one base station, a peak data rate of 20 Gbps in the downlink and a peak data rate of 10 Gbps in the uplink. At the same time, the 5G communication system needs to provide an increased perceived data rate of a user equipment. In order to satisfy these requirements, the 5G communication system requires enhanced transmission or reception technology including enhanced multi-input multi-output (MIMO) transmission technology. Further, LTE uses a 2 GHz band, whereas the 5G communication system uses a wider frequency bandwidth of 20 MHz in a frequency band of 3 to 6 GHz or a frequency band higher than 6 GHz, and thus can satisfy the required data rate.

In the 5G communication system, mMTC is considered to support an application service such as the Internet of Things (IoT). In order to efficiently provide the Internet of Things, the mMTC needs to satisfy requirements such as massive terminal connection support in a cell, terminal coverage improvement, increased battery lifetime, and terminal cost reduction. Since the Internet of Things is attached to several sensors and various devices to provide communication functions, the Internet of Things needs to support a large number of terminals (e.g., 1,000,000 terminals/km$^2$) in the cell. Further, a terminal supporting mMTC is highly likely to be located in a shaded area that cannot be covered by a cell, such as a basement of a building, due to the service characteristics and thus, may require wider coverage than other services provided in the 5G communication system. The terminal supporting mMTC needs to be configured as a low-cost terminal, and requires a very long battery lifetime since it is difficult to frequently replace a battery of the terminal.

The URLLC is a cellular-based wireless communication service used for a specific (mission-critical) purpose, and the service may be used for remote control of a robot or machinery, industrial automation, unmanned aerial vehicles, remote health care, emergency alerts, and the like, thereby providing communication with very low latency and very high reliability. For example, a service supporting the URLLC needs to satisfy a wireless access latency time (air interface latency) that is shorter than 0.5 ms and at the same time, requires a packet error rate of $10^{-5}$ or less. Accordingly, for the service supporting the URLLC, the 5G system needs to provide a transmission time interval (TTI) that is smaller than that of other services, and also must satisfy design requirements for allocating wide resources in the frequency band. However, the mMTC, URLLC, and eMBB described above are only examples of different service types, and the service types to which the present disclosure is applied are not limited to the above-described examples.

The services considered in the 5G communication system described above needs to be provided by being converged with each other based on one framework. That is, for efficient resource management and control, it is preferable that respective services are integrated and controlled as one system and transmitted, rather than being operated independently.

In addition, hereinafter, an embodiment will be described as an example of the LTE, LTE-A, LTE Pro, or NR system, but embodiments may be applied to other communication systems having similar technical backgrounds or channel types. In addition, embodiments may be applied to other communication systems through modifications within a range that do not significantly depart from the scope of the disclosure, with reference to a determination by a person skilled in the art.

FIG. 1 illustrates DC according to an embodiment of the disclosure.

Dual connectivity (DC) corresponds to a situation in which a UE is simultaneously connected to two base stations and performs communication using a radio resource provided by each base station. DC is configured for the terminal and thus, throughput provided to the UE and data rate may be increased. In DC, a base station that controls a primary cell (PCell) served by a UE may be referred to as a master node (MN) or a master base station, and a base station that controls only a secondary cell (SCell), other than a PCell, may be referred to as a secondary node (SN) or secondary base station. A group of one or more cells, which the MN supports for the UE, is referred to as a master cell group (MCG), and a group of one or more cells, which the SN supports for the UE, is referred to as a secondary cell group (SCG).

Additionally, DC corresponds to a situation in which two different nodes connected via a non-ideal backhaul or an ideal backhaul allocate radio resources to a UE to perform communication. In DC, in particular, the case where the MN is an LTE base station (i.e., an eNB) connected to an evolved packet core (EPC) and the SN is an NR base station (i.e., a gNB) connected to a 5G core (5GC) is referred to as EUTRA-NR DC (EN-DC). An NR base station operating in the EN-DC may be referred to as an en-gNB. For example, in FIG. 1, DC, in which an eNB 120 serves as the MN and a gNB 130 serves as the SN, may be configured for a UE 110, and the UE may be connected to a network entity 140 (e.g., a mobility management entity (MME) or a serving gateway (S-GW)) of the EPC through the eNB 120 and gNB 130 so as to transmit or receive a data packet.

Referring to FIG. 1, apart from an illustrated situation 100, other DC scenarios, such as NG-RAN E-UTRA-NR Dual Connectivity (NGEN-DC), NR-E-UTRA dual connectivity (NE-DC), and NR-NR dual connectivity (NR-DC) may be considered according to the core network of the two base stations to which a UE is connected and a radio access technology (RAT), and other DC scenarios described above may be collectively referred to as multi-radio dual connectivity (MR-DC). The EN-DC described above may denote an MR-DC scenario involving connection to an EPC.

As described above, various scenarios in DC can be considered. Hereinafter, a protocol stack of a base station and a UE is described using EN-DC as an example.

Figure 2:
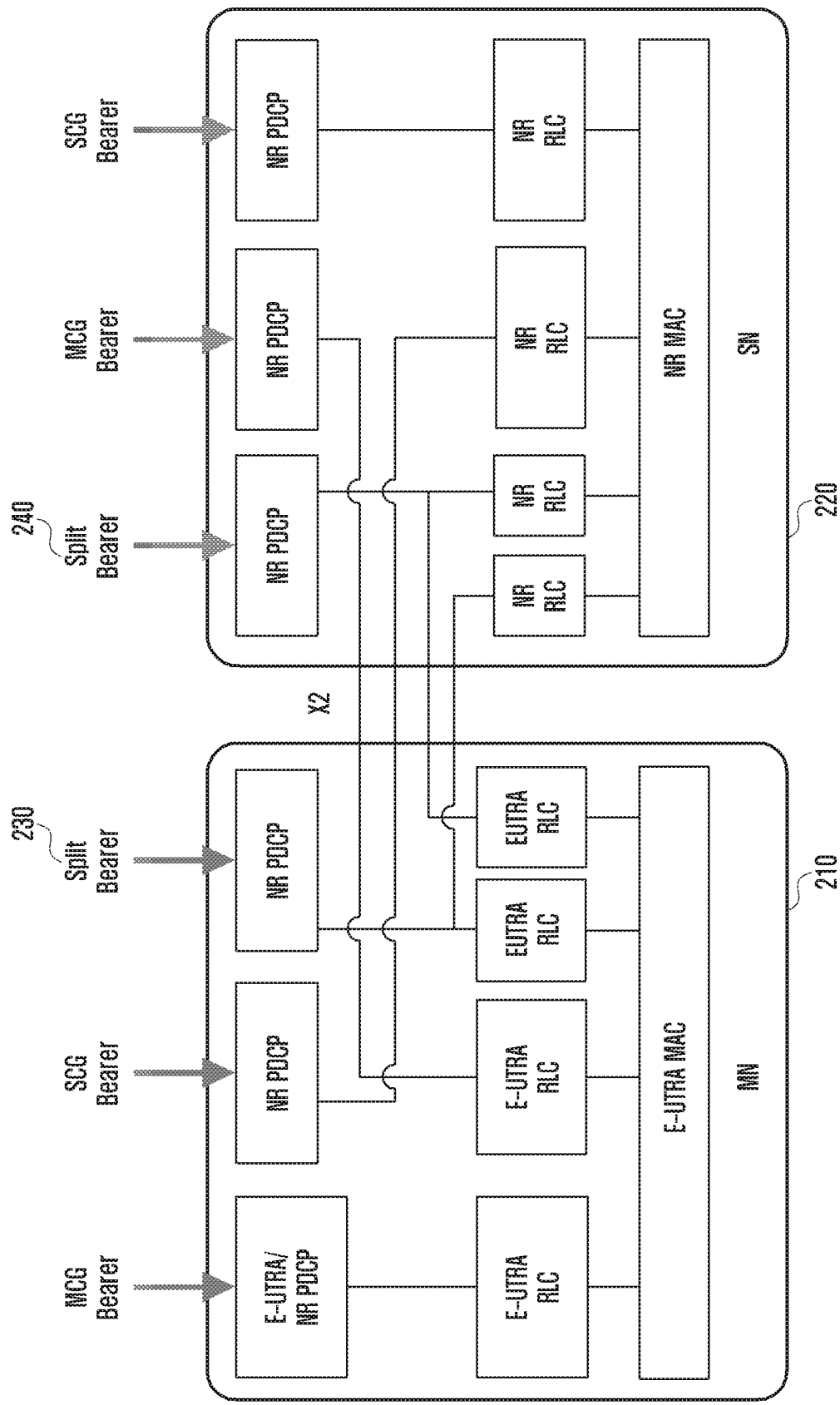
FIG. 2 illustrates a part of a protocol stack of a base station that can be applied to DC according to an embodiment of the disclosure.

FIG. 2 illustrates a part of a protocol stack of a base station that can be applied to DC according to an embodiment of the disclosure.

Referring to FIG. 2, in the case where EN-DC is configured for a UE, three types of bearers, such as an MCG bearer, an SCG bearer, and split bearers, may be configured for an MN 210 and a SN 220. The MCG bearer denotes a radio bearer connected to a radio link control (RLC) bearer for an MCG, the SCG bearer denotes a radio bearer connected to a RLC bearer for an SCG, and split bearers 230 and 240 denote bearers connected to both the RLC bearer for the MCG and the RLC bearer for the SCG. That is, the split bearers 230 and 240 may be considered both for an MN-terminated bearer connected to a packet data convergence protocol (PDCP) of the MN and an SN-terminated bearer connected to a PDCP of the SN. At this time, for the split bearers 230 and 240, an NR PDCP is applied to both the MN and the SN.

Figure 3:
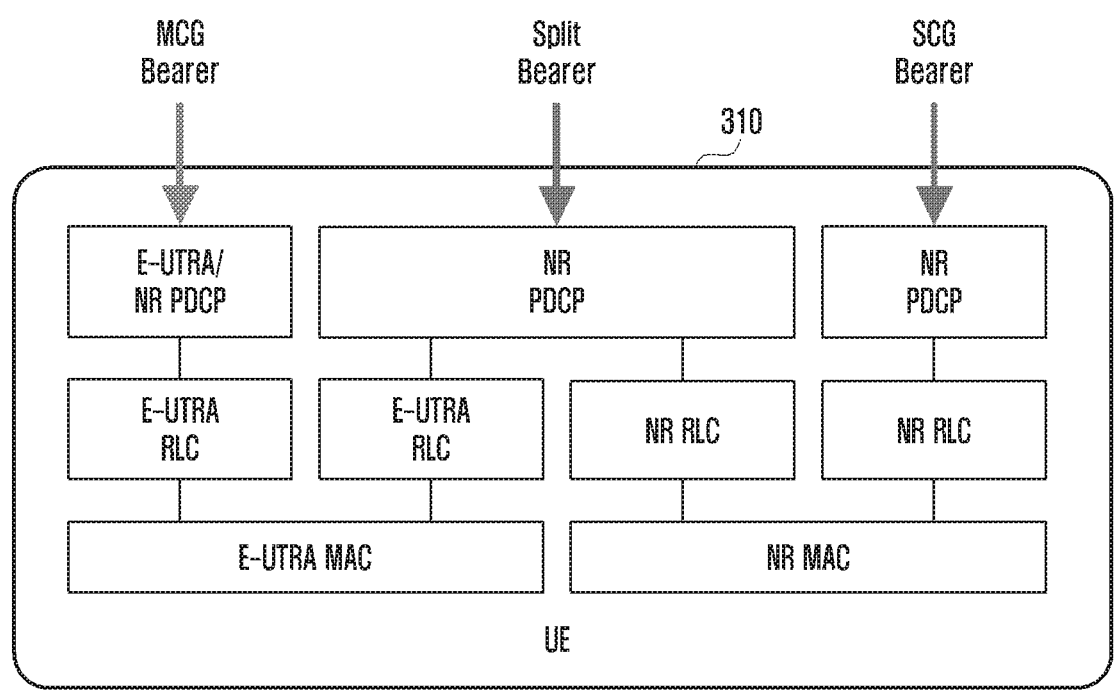
FIG. 3 illustrates a part of a protocol stack of a UE that can be applied to DC according to an embodiment of the disclosure.

FIG. 3 illustrates a part of a protocol stack of a UE that can be applied to DC according to an embodiment of the disclosure.

Referring to FIG. 3, for a UE 310, a protocol stack corresponding to a base station, described in FIG. 2, is also considered. A PDCP of the UE is associated with an operation of connecting a split bearer to an MN RLC bearer for connection with the MN and to an SN RLC bearer for connection with the SN, respectively, and is associated with an operation of routing an uplink data packet of the split bearer. In addition, at the time of reception of a PDCP PDU, the PDCP of the UE is associated with reordering of the uplink data packet of the split bearer.

An example of a protocol stack of a base station and a UE that can be applied to the EN-DC has been described. The above description of the bearer may be similarly applied to an MR-DC scenario connected to 5GC. In the MR-DC, there is a difference in that a service data adaptation protocol (SDAP) layer may be further included in a UE and a base station. The SDAP is associated with processing of a quality of service (QoS) flow and mapping the processed QoS flow to a radio bearer, and the SDAP layer may be located above the PDCP layer in each of the UE and the base station.

FIG. 4 views (a) and (b) illustrate signaling between nodes configuring DC according to an embodiment of the disclosure.

Referring to FIG. 4, views (a) and (b) illustrate a signaling procedure related to a process of transmitting or receiving downlink (DL) user plane data in NR. In NR, a PDCP is associated with a function of transmitting user plane data. Such a downlink data transmission procedure may be understood as a process of transmitting data (for example, a PDCP protocol data unit (PDU)) to a corresponding a node 420 by a node 410 hosting an NR PDCP.

The host node 410 and the corresponding node 420 may be implemented in one base station. In the case of the split bearer of DC described above, the host node 410 and the corresponding node 420 may be implemented in different base stations. In the case of the MN-terminated bearer, the host node 410 is an MN and the corresponding node 420 is an SN. In the case of the SN-terminated bearer, the host node 410 is the SN and the corresponding node 420 is the MN.

The host node 410 may correspond to a central unit (CU) in a central unit/distributed unit (CU-DU) separation structure in view of the feature that the host node 410 is a node in which a PDCP is located. In this case, the corresponding node 420 may correspond to the DU of the CU-DU separation structure. The CU-DU separation structure performs functionally or hierarchically separate implementation of base stations, and is a structure in which each of the CU and the DU performs some operations of all base stations. For example, the CU may be associated with radio resource control (RRC) and PDCP functions of the base station, and the DU may be associated with RLC, medium access control (MAC), and physical (PHY) functions of the base station.

In addition to the separate implementation method, the CU and the DU may be separately implemented to handle different layers/functions. Each of the CU and the DU may be understood as an independent base station (or node) in that the CU and the DU can be physically implemented separately. That is, the "base station" in the following description may be a concept describing the CU, the DU, or both the CU and the DU.

Referring to view (a) in FIG. 4, the host node 410 transmits downlink user data to the corresponding node 420 (indicated by reference numeral 430). The corresponding node 420 may transmit the received downlink user data to a lower layer and transmit the same to a UE.

Referring to view (b) in FIG. 4, the corresponding node 420 transmits a DL data delivery status (DDDS) to the host node 410 (indicated by reference numeral 440). The DDDS is feedback information for allowing the corresponding node 420 to control the flow of the downlink user data to the host node 410, and the host node 410 may transmit the downlink user data to the corresponding node 420 based on the DDDS received from the corresponding node 420. For example, the host node 410 may determine the amount of data to be transmitted to the corresponding node 420, based on the desired buffer size and the desired data rate included in the DDDS.

The DDDS may be used to control the host node 410 to successfully transmit DL control data to the corresponding node 420. The DDDS is periodically transmitted from the corresponding node 420 to the host node 410, or is transmitted in response to a request from the host node 410, and in the case where a PDCP PDU corresponding to a specific sequence number is successfully transmitted in a sequential manner, the DDDS may be transmitted to the host node 410.

Figure 5:
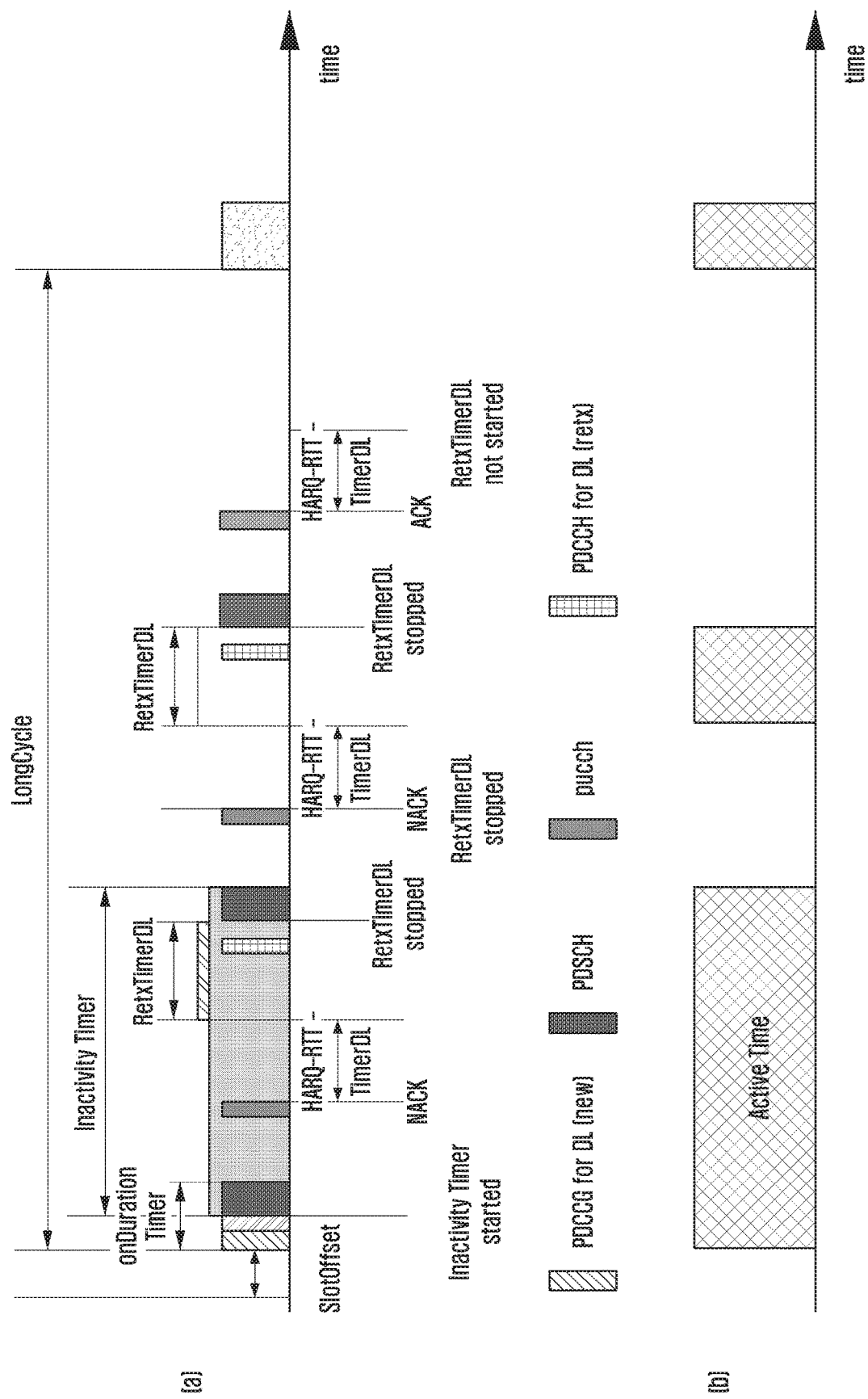
FIG. 5 views (a) and (b) illustrate a DRX operation according to an embodiment of the disclosure.

View (a) and (b) in FIG. 5 illustrate a DRX operation according to an embodiment of the disclosure.

DRX (or continuous DRX (C-DRX)) refers to an operation of reducing the amount of power consumed for monitoring a control channel (e.g., a physical downlink control channel (PDCCH)) by a UE. The base station may configure DRX-related parameters for a UE, and the DRX-related parameters may include, for example, onDurationTimer, InactivityTimer, RetxTimerDL, RetxTimerUL, and the like. The UE for which DRX has been configured monitors only some control channels based on the DRX-related parameters, instead of monitoring all control channels, and accordingly, the amount of power consumed for blind decoding and monitoring of the control channel by the UE may be reduced.

Referring to View (a) in FIG. 5, the UE monitors a control channel at a predetermined cycle, and the time during which the UE monitors the control channel is referred to as an active time in view (b). For example, the UE may monitor a control channel while onDurationTimer is maintained; upon reception of the control channel during the onDurationTimer, may maintain onDuration during InactivityTimer and additionally monitor the control channel; and may monitor a control channel for retransmission during RetxTimerDL after a hybrid automatic repeat request (HARQ) round trip time (RTT) timer has expired.

Alternatively, the UE transmits a scheduling request (SR) to a base station separately from the DRX-related parameter and monitors a control channel even in the case where the SR is in a pending state. Further, the UE monitors the control channel even in the case where a PDCCH to which a cell radio network temporary identifier (C-RNTI) is allocated is not received after receiving a random access response (RAR) for a random access preamble that is not selected by the UE.

If DRX has been configured for the UE and the UE monitors a control channel during an active time, the UE may receive data from a physical downlink shared channel (PDSCH) scheduled according to control information received through the PDCCH. The UE may transmit uplink control information to a base station through a physical uplink control channel (PUCCH), with respect to the received PDSCH, and this process is performed separately from the control channel monitoring according to DRX.

The base station configures DRX for a UE by transmitting DRX-related parameters to the UE through RRC signaling. In the case of DC described above, the MN and the SN separately transmit respective DRX-related parameters to the UE. In the case where RATs supported by MN and SN are different (for example, in the case where the MN supports LTE and the SN supports NR), DRX parameters are different for the MN and the SN, and the active time configuration is made separately.

Accordingly, the UE operates DRX independently for each of the MN and SN, which means that the active time during which the UE performs control channel monitoring for the MN and the active time during which the UE performs control channel monitoring for the SN do not coincide.

In addition, in DC, even in the case where the radio access technologies (RATs) supported by the MN and the SN are the same, since the MN and the SN independently configure DRX parameters, it is not guaranteed that active time for the MN of the UE and active time for the SN of the UE coincide with each other.

Figure 6:
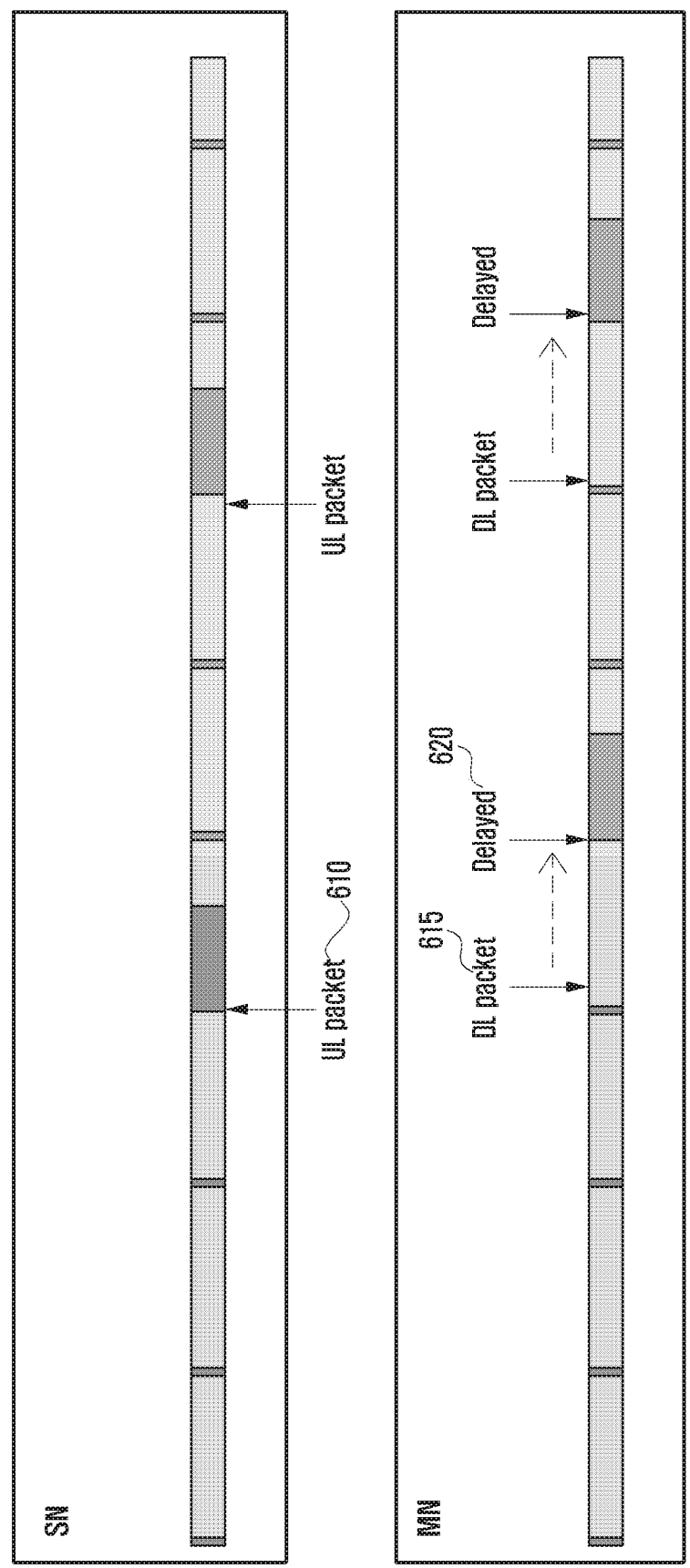
FIG. 6 illustrates a case where packet transmission paths of a UE operating in a DRX mode according to an embodiment of the disclosure do not coincide with each other.

FIG. 6 illustrates a case where packet transmission paths of a UE operating in a DRX mode according to an embodiment of the disclosure do not coincide with each other.

Figure 7:
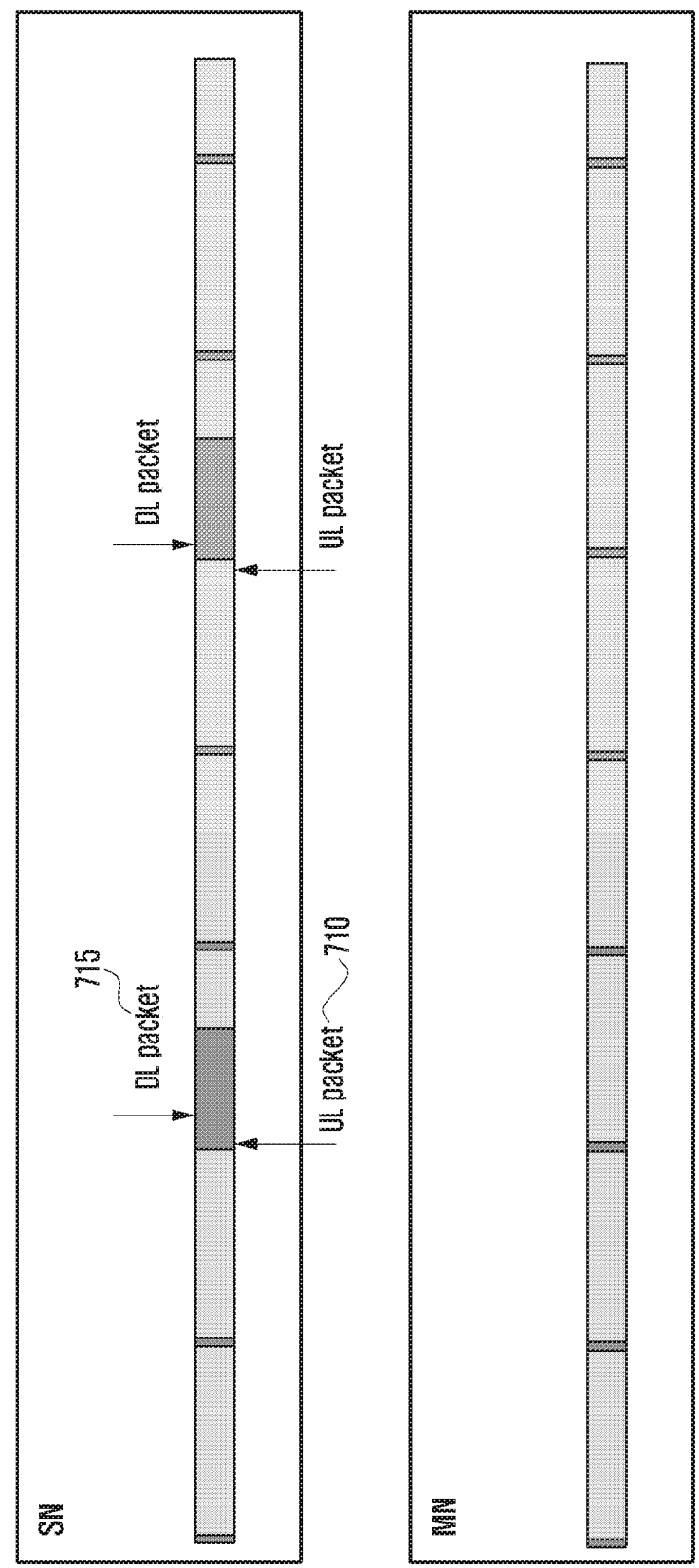
FIG. 7 illustrates a case where packet transmission paths of a UE operating in a DRX mode according to an embodiment of the disclosure coincide with each other.

FIG. 7 illustrates a case where packet transmission paths of a UE coincide with each other according to an embodiment of the disclosure.

Referring to FIGS. 6 and 7, situations are illustrated in which an EN-DC is configured for a UE, and the UE communicates with one base station (MN or SN) based on the NR system and communicates with another base station (SN or MN) based on the LTE system. The EN-DC is only an example, and the same situation can be applied to any DC other than the EN-DC.

As described above, in DC, the MN and the SN independently configure DRX for the UE, and the UE independently operates DRX for the MN and the SN. In this case, FIG. 6 illustrates the situation in which a DL data packet received by the UE and a UL data packet transmitted by the UE are transmitted or received through different nodes (MN or SN). That is, the transmission paths do not coincide with respect to a DL/UL packet pair.

For example, FIG. 6 illustrates the case where a UE transmits a UL packet through the SN (indicated by reference numeral 610) but a subsequent DL packet is received through the MN (indicated by reference numeral 615). The UE transmits the UL packet through the SN, expects, for a predetermined time, the DL packet to be transmitted, and monitors a control channel for the SN, but the DL packet is received through the MN.

Here, in DC, the base station (i.e., the SN) that received the UL packet of the UE and the base station (i.e., the MN) that transmitted the DL packet to the UE are different nodes, and the UE receives the DL packet from the MN during an active time during which the control channel of the MN is monitored based on the DRX parameter configured by the MN (indicated by reference numeral 620). As such, since the active time of the MN does not coincide with the active time of the SN, power consumption is wasted because the UE performs unnecessary SN control channel monitoring after transmitting the UL packet through the SN. In addition, since the UE receives the DL packet of the MN separately from the SN at an active time operating independently of the MN, unexpected latency occurs in the reception of the DL packet.

The situation described above may occur in the same manner in a process in which the base station transmits the downlink packet through the SN and then receives the uplink packet from the UE through the MN.

Referring to FIG. 7, a situation is illustrated in which a DL data packet received by a UE and a UL data packet transmitted by the UE are transmitted or received through the same node (an MN or an SN). That is, FIG. 7 illustrates a situation in which transmission paths with respect to a DL/UL packet pair coincide with each other.

In FIG. 7, unlike FIG. 6, the UE transmits a UL packet through the SN (indicated by reference numeral 710), and receives a DL packet from the SN during a subsequent active time (indicated by reference numeral 715). That is, the UE transmits the UL packet to the SN and then monitors a control channel of the SN and receives a subsequent DL packet from the SN during the active time. As such, if the transmission paths of the DL/UL packet pairs coincide with each other, the DRX operation for monitoring the control channel of the UE can achieve the original purpose thereof, and it is possible to prevent unnecessary increase in packet transmission latency.

However, as described above, in DC, it is highly unlikely that the transmission paths of the packet pairs coincide with each other and that the DRX is independently configured for the UE with respect to the MN and the SN. Accordingly, there is a need for a method for solving transmission latency and power consumption caused by transmitting or receiving packets to or from a UE for which DRX has been configured through different paths.

The situation described above may cause a problem particularly in a situation in which specific packets are sequentially transmitted or received, such as a ping request and a ping response of a network service provider, a transmission control protocol (TCP) 3-way handshake performed in a way of SYN-SYN+ACK-ACK, a stop and wait protocol, and the like.

Hereinafter, embodiments for solving the problems described above will be described in detail.

Figure 8:
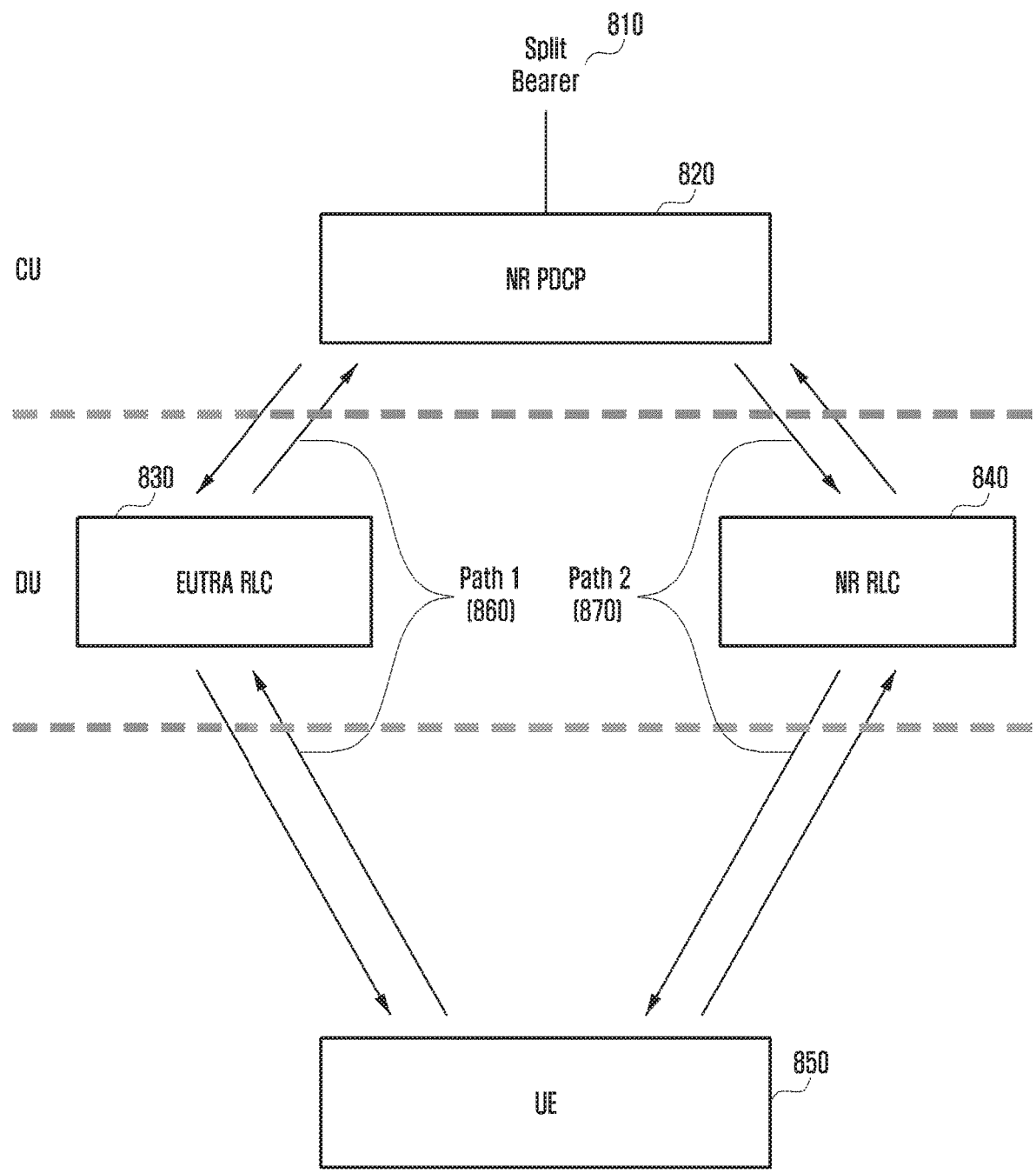
FIG. 8 illustrates an example of a transmission path that may be considered in a split bearer of DC according to an embodiment of the disclosure.

FIG. 8 illustrates an example of a transmission path that may be considered in a split bearer of DC according to an embodiment of the disclosure. In FIG. 8, an EN-DC situation will be described as an example.

Referring to FIG. 8, a base station for transmitting or receiving a data packet for a split bearer 810 may be an MN or an SN of a UE for which DC has been configured. In the case of an MN-terminated bearer, an NR PDCP 820 is the PDCP of the MN, and in the case of an SN-terminated bearer, the NR PDCP 820 is the PDCP of the SN.

In the case of EN-DC in FIG. 8, a EUTRA RLC 830 may be the RLC of MN, and an NR RLC 840 may be the RLC of SN. Considering that a PDCP belongs to a CU and the RLC belongs to a DU in the CU-DU split structure, the NR PDCP 820 may be the CU, and each of the EUTRA RLC 830 and the NR RLC 840 may be the DU.

In addition, the NR PDCP 820 of FIG. 8 may be the host node 410 described in FIG. 4, and each of the EUTRA RLC 830 and the NR RLC 840 may be the corresponding node 420. That is, the NR PDCP 820 (or the host node 410) may transmit downlink user data to the EUTRA RLC 830 and/or the NR RLC 840 (or the corresponding node 420), and the EUTRA RLC 830 and/or the NR RLC 840 (or corresponding node 420) may transmit a DDDS to the NR PDCP 820 (or host node 410).

The EUTRA RLC 830 and the NR RLC 840 communicate with a UE using radio resources according to RATs supported by each of the EUTRA RLC 830 and the NR RLC 840. For example, the EUTRA RLC 830 and the NR RLC 840 transmit the received downlink user data to a UE 850, and the EUTRA RLC 830 and the NR RLC 840 transmit the uplink user data received from the UE 850 to the NR PDCP 820.

In the split bearer, the NR PDCP 820, which is associated with transmission of user data, may communicate with the UE 850 through one or more paths of the MN and the SN configuring the DC. For example, in the case where the NR PDCP 820 transmits or receives a downlink/uplink data packet to or from the UE 850 through the MN, a connection from the NR PDCP 820 to the UE 850 via the EUTRA RLC 830 may be referred to as a path.

Similarly, in the case where the NR PDCP 820 transmits or receives a downlink/uplink data packet to or from the UE

850 through the SN, a connection from the NR PDCP 820 to the UE 850 via the NR RLC 840 is referred to as another path.

That is, in DC, a path through which data of a split bearer is transmitted or received to or from a UE may include path 1 860, which is established by passing through the MN, and path 2 870, which is established by passing through the SN.

Next, a process in which a base station determines a path for transmitting a downlink data packet will be described first. In the case where downlink data of the split bearer is generated, the NR PDCP 820 selects a path for transmitting the downlink data to the UE 850 operating in a DRX mode. At this time, as described above, if the path of the downlink data packet coincides with the path of the uplink data packet, which has paired with the downlink data packet, unnecessary power consumption in the DRX mode can be reduced and packet transmission latency can also be prevented.

Accordingly, the NR PDCP 820 identifies a reception path of the uplink data packet corresponding to the downlink data packet and determines the transmission path of the downlink data packet to be the same as the reception path of the uplink data packet. That is, the NR PDCP 820 may select the transmission path of the downlink data packet to be the same as the transmission path of the uplink data packet.

For example, if the uplink data packet received by the NR PDCP 820 has been received through path 1 860 which is established by passing through the MN, the NR PDCP 820 may transmit the corresponding downlink data packet to the UE 850 through path 1 860 established by passing through the MN. If the uplink data packet, which has been received by the NR PDCP 820, has been received through path 2 870 established by passing through the SN, the NR PDCP 820 may transmit the corresponding downlink data packet to the UE 850 through path 2 870 established by passing through the SN.

The NR PDCP 820 does not need to perform such a path selection process for all transmitted or received packets. This is because, in a situation in which packets are continuously transmitted or received, the UE may always monitor a control channel without entering the DRX mode, so that transmission latency or power consumption is not wasted.

Therefore, the NR PDCP 820 may perform the path selection process described above with respect to a specific uplink packet (for example, a ping request/response, a TCP 3-way handshake-related packet, or a stop-and-wait protocol-based packet, which have been described in the above).

In another embodiment, the NR PDCP 820 operating as a host node receives a DDDS from the EUTRA RLC 830 or NR RLC 840 operating as a corresponding node.

At this time, the NR PDCP 820 may configure a predetermined flag in order to establish the transmission path of a downlink data packet to be transmitted. Specifically, the NR PDCP 820 may configure a path flag as 0, and may configure the path flag as 1 if the specific data packet described above or a data packet following the DDDS is received. Subsequently, the NR PDCP 820 may identify the value of a path flag in the case of selecting a path for transmitting the downlink data packet, and if the value of the path flag is 1, the NR PDCP 820 may transmit the downlink data packet through the transmission path of the previously received data packet. Subsequently, in the case where the transmission of the downlink data packet is completed, the NR PDCP 820 may configure the value of the flag back to 0.

If the value of the path flag is 0, the NR PDCP 820 may not consider the path of the uplink data packet in the determination of the transmission path of the downlink data packet. In this case, the NR PDCP 820 may select the transmission path of a downlink data packet according to predetermined conditions, rules, load conditions of a node, or any other criteria.

Through the embodiment in which a predetermined flag is configured as described above, it is possible to determine transmission paths for some data packets (for example, the first downlink packet after the uplink packet is received) to be the same.

The embodiments described above may be similarly applied to the process of selecting the transmission path of the uplink data packet by a UE. If the uplink data packet is generated, the PDCP of the UE 850 transmits the uplink data packet through a specific base station among two base stations (MN and SN) configuring DC which has been configured for the UE 850. If the transmission path of the uplink data packet coincides with the transmission path of the downlink data packet, which has paired with the uplink data packet, packet transmission latency can also be prevented.

Therefore, the UE 850 identifies the transmission path of the received downlink data packet and determines the transmission path of the uplink data packet to be transmitted by the UE itself to be the same path as the reception path of the downlink data packet. That is, the UE 850 may match the transmission path of the uplink data packet with the reception path of the downlink data packet.

For example, if the downlink data packet that has been received by the UE 850 is received through path 1 860, established by passing through the MN, the UE 850 may transmit the uplink data packet to be transmitted by the UE itself through path 1 860, established by passing through the MN. If the downlink data packet that has been received by the UE is received through path 2 870, established by passing through the SN, the UE 850 may transmit the uplink data packet through path 2 870, established by passing through the SN.

The embodiment in which the path flag is configured may be similarly applied to the process in which the UE 850 determines the transmission path. Specifically, the UE 850 may configure a path flag as 0, and may configure the path flag as 1 if a specific downlink data packet is received. Subsequently, the UE 850 identifies the value of path flag in the case of selecting a path for transmitting the uplink data packet. If the value of the path flag is 1, the UE 850 may transmit the uplink data packet through the transmission path of the previously received downlink data packet. Subsequently, the UE 850 may configure the value of the flag back to 0 if transmission of the uplink data packet is completed.

If the value of the path flag is 0, the UE 850 may determine the transmission path of the uplink data packet without considering the transmission path of the previously received downlink data packet. In this case, the UE 850 may select a transmission path of the uplink data packet according to predetermined conditions, rules, node load conditions, or any criteria.

In the above, the case of the EN-DC situation in FIG. 8 has been described in detail. However, the embodiments described above may be similarly applied to various other DC situations, without being limited to the above. For example, in the case where two base stations configuring DC are LTE-based base stations, EUTRA PDCP, instead of NR PDCP, may perform the operations described above.

Figure 9:
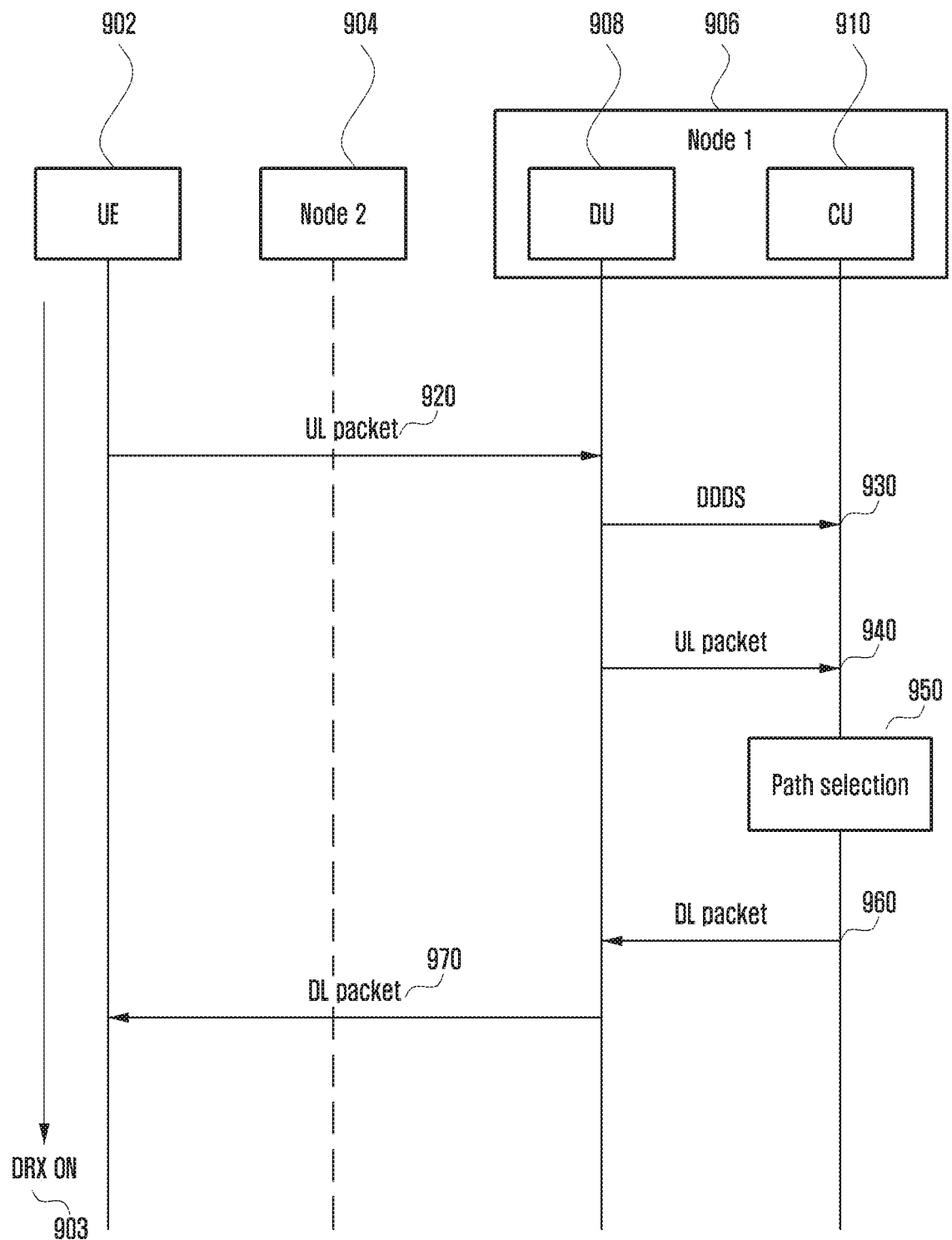
FIG. 9 is a signal flow diagram illustrating a process in which a base station selects a transmission path according to an embodiment of the disclosure.

FIG. 9 is a signal flow diagram illustrating a process in which a base station selects a transmission path according to an embodiment of the disclosure.

Referring to FIG. 9, Node 1 906 and node 2 904 of FIG. 9 indicate two base stations involved in DC, which have been configured for a UE 902. Node 1 906 denotes a node in which a split bearer is terminated in DC. For example, if the split bearer is an MN-terminated bearer, node 1 906 may be an MN. A CU 910 of node 1 906 may include the PDCP of the MN, and a DU 908 of node 1 906 may include the RLC and PHY of the MN. At this time, node 2 904 may be an SN. If the split bearer is an SN-terminated bearer, node 1 906 may be an SN and node 2 904 may be an MN.

The UE 902 transmits an uplink packet through node 1 906 (indicated by reference numeral 920). The corresponding node (i.e., the DU 908 of node 1 906), which has received the uplink packet, transmits a DDDS to a host node (i.e., the CU 910 of node 1 906) for hosting a PDCP that is associated with data transmission (indicated by reference numeral 930). Subsequently, the corresponding node (i.e., the DU 908) transmits an uplink packet, received from the UE, to the host node (i.e., the CU 910) (indicated by reference numeral 940). The host node (that is, the CU 910) may transmit the received uplink packet to a higher layer network entity or to a core network entity.

Subsequently, the host node (i.e., the CU 910) receives a downlink packet corresponding to the received uplink packet from a higher layer network entity or a core network entity, and selects a path for transmitting the received downlink packet (indicated by reference numeral 950). At this time, the host node (i.e., the CU 910) may determine the transmission path of the downlink packet by identifying the type of the received uplink packet or the configured value of a flag.

For example, according to the embodiment described in FIG. 8, if it is determined that the received packet is a packet of a specific type (a ping request/response, a TCP 3-way handshake, a stop-and-wait protocol-based packet, or the like) or if it is identified that the value of path flag is configured as 1, the host node (i.e., the CU 910) may select a transmission path of a downlink packet that is the same as the transmission path of the uplink packet.

Subsequently, the host node (i.e., the CU 910) transmits a downlink packet through the selected path (indicated by reference numeral 960). That is, the host node (i.e., the CU 910) transmits the downlink packet to a corresponding node (i.e., the DU 908), which has transmitted an uplink packet to the host node, and the corresponding node (i.e., the DU 908) transmits the received downlink packet to the UE 902 (indicated by reference numeral 970).

The UE 902 expects that the downlink packet will be received from node 1 906, which has transmitted the uplink packet, while operating based on the preconfigured DRX parameter 903. Therefore, the UE 902 does not need to unnecessarily perform control channel monitoring for node 2 904 and a packet is received through node 2 904, so that unexpected packet transmission latency due to being required to wait until the active time does not occur.

Unlike the illustrated embodiment, if the UE 902 has transmitted the uplink packet through node 2 904, the host node (CU of node 1), which has received the uplink packet from the corresponding node (DU of node 2)), determines node 2 904 to be the corresponding node, in a case of selecting the transmission path of the downlink packet, and transmits the downlink packet to the UE 902.

Figure 10:
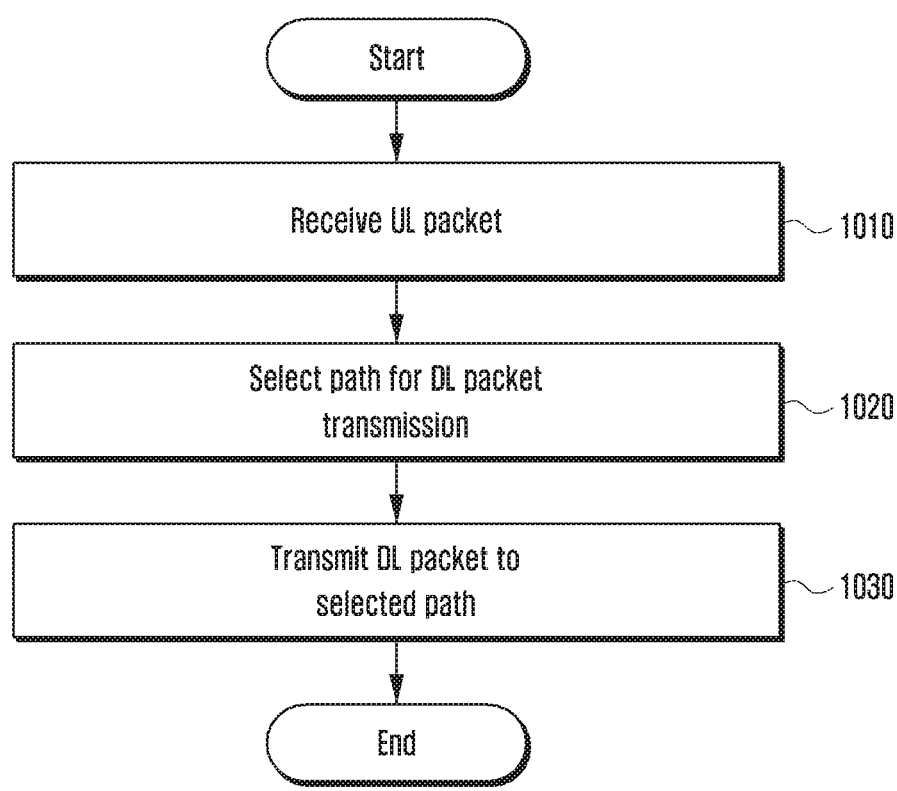
FIG. 10 is a flowchart illustrating an operation by a base station of selecting a transmission path according to an embodiment of the disclosure.

FIG. 10 is a flowchart illustrating an operation by a base station of selecting a transmission path according to an embodiment of the disclosure.

Referring to FIG. 10, an operation of node 1 (particularly, the CU of node 1), which is a host node in the embodiment described in FIG. 9 is illustrated. As described above, the CU and the DU together configure a base station, and the CU and the DU are a node of a base station and a node of a network, respectively.

The base station (that is, the host node) receives an uplink packet transmitted from the UE (indicated by reference numeral 1010). The uplink packet may be transmitted from one of the corresponding nodes (i.e., MN and SN) configuring DC to the host node.

Subsequently, the base station (that is, the host node) selects a path for transmission of a downlink packet corresponding to the uplink packet (indicated by reference numeral 1020). The base station (that is, the host node), including a PDCP for a split bearer, may transmit the downlink packet through one of two corresponding nodes (MN and SN). At this time, the base station (that is, the host node) may select the transmission path of the downlink packet, which is the same as the path of the previously received uplink packet, according to the embodiments described above.

Subsequently, the base station (that is, the host node) transmits the downlink packet to the UE through the selected path (indicated by reference numeral 1030).

Figure 11:
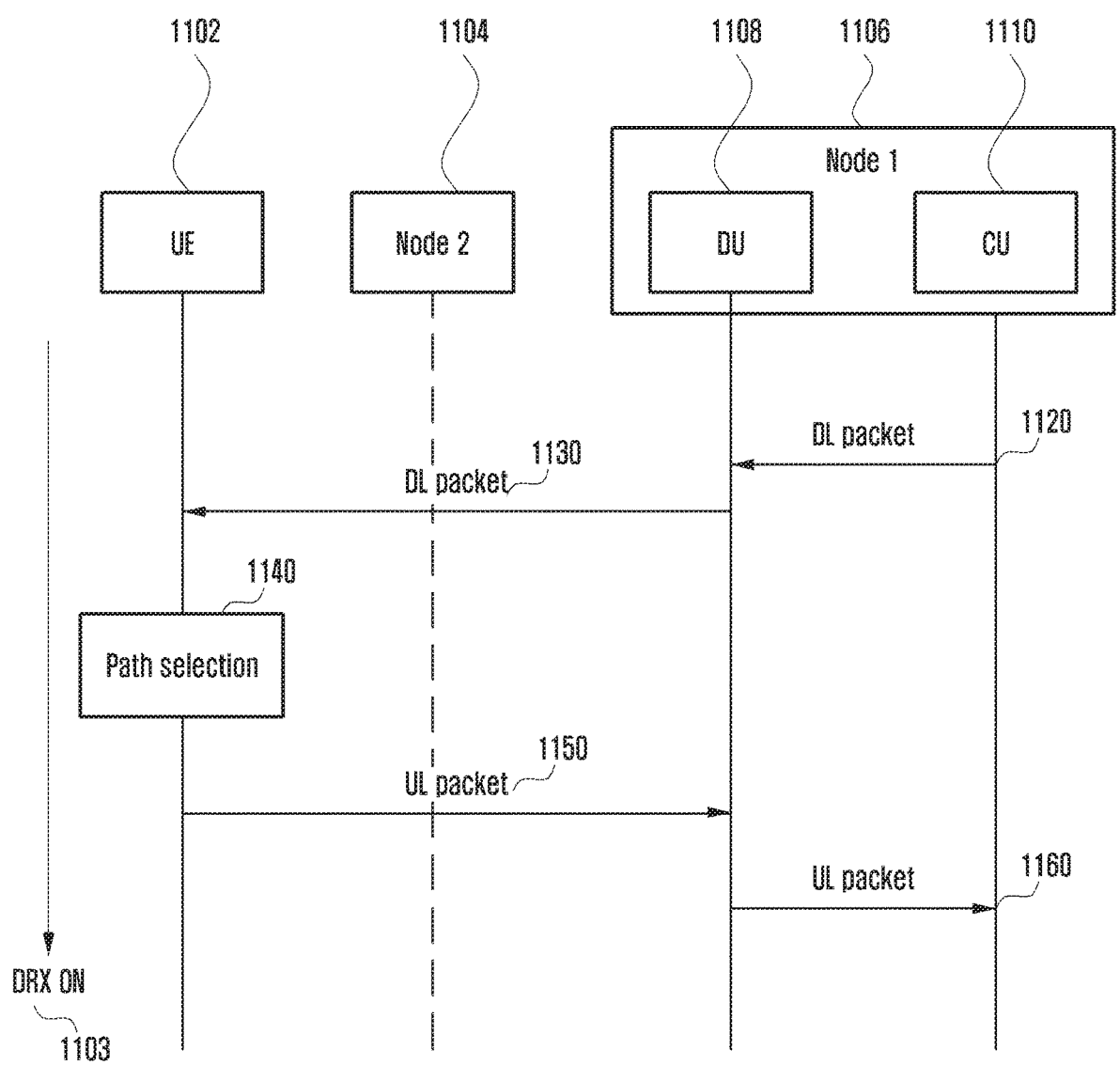
FIG. 11 is a signal flow diagram illustrating a process in which a UE selects a transmission path according to an embodiment of the disclosure.

FIG. 11 is a signal flow diagram illustrating a process in which a UE selects a transmission path according to an embodiment of the disclosure. The process of selecting a transmission path of the base station, which has been described in FIG. 9, can be similarly applied to a UE.

Referring to FIG. 11, node 1 1106 and node 2 1104 indicate two base stations in DC, which have been configured for a UE 1102. Node 1 1106 denotes a node in which a split bearer is terminated in DC. For example, in the case of an MN-terminated bearer, node 1 1106 may be an MN and node 2 1104 may be an SN. In the case of an SN-terminated bearer, node 1 1106 may be the SN and node 2 1104 may be the MN.

The host node (i.e., a CU 1110 of node 1) transmits a downlink packet to the corresponding node (i.e., a DU 1108 of node 1) (indicated by reference numeral 1120), and the corresponding node (i.e., the DU 1108 of node 1) transmits the received downlink packet to the UE (indicated by reference numeral 1130).

Subsequently, the UE 1102, operating in the DRX mode 1103, generates an uplink packet corresponding to the received downlink packet, and selects a path for transmitting the uplink packet (indicated by reference numeral 1140). At this time, the UE 1102 may determine the transmission path of the uplink packet by identifying the type of the received downlink packet or the configured value of a flag.

For example, according to the embodiment described in FIG. 8, if it is identified that the received packet is a packet of a specific type (a ping request/response, a TCP 3-way handshake, a stop-and-wait protocol-based packet, and the like) or if it is identified that the value of the path flag is configured as 1, the UE 1102 may select the transmission path of an uplink packet to be the same path as the transmission path of the downlink packet.

Subsequently, the UE 1102 transmits the uplink packet through the selected path (indicated by reference numeral 1150). That is, the UE 1102 transmits the uplink packet to a corresponding node (i.e., the DU 1108 of node 1), which has transmitted the downlink packet to the UE, and the corresponding node (i.e., the DU 1108 of node 1) transmits the received uplink packet to a host node (i.e., the CU 1110 of node 1) (indicated by reference numeral 1160).

Unlike the illustrated embodiment, if the host node (i.e., the CU 1110 of node 1) has transmitted the downlink packet to node 2 1104 as the corresponding node, the UE 1102, which has received the downlink packet from node 2 1104, selects a path, which is obtained by passing through node 2 1104, upon selecting the transmission path of the uplink packet, and transmits the uplink packet therethrough. At this time, node 2 1104, which is the corresponding node, transmits the received uplink packet to the host node (i.e., the CU 1110 of node 1).

Figure 12:
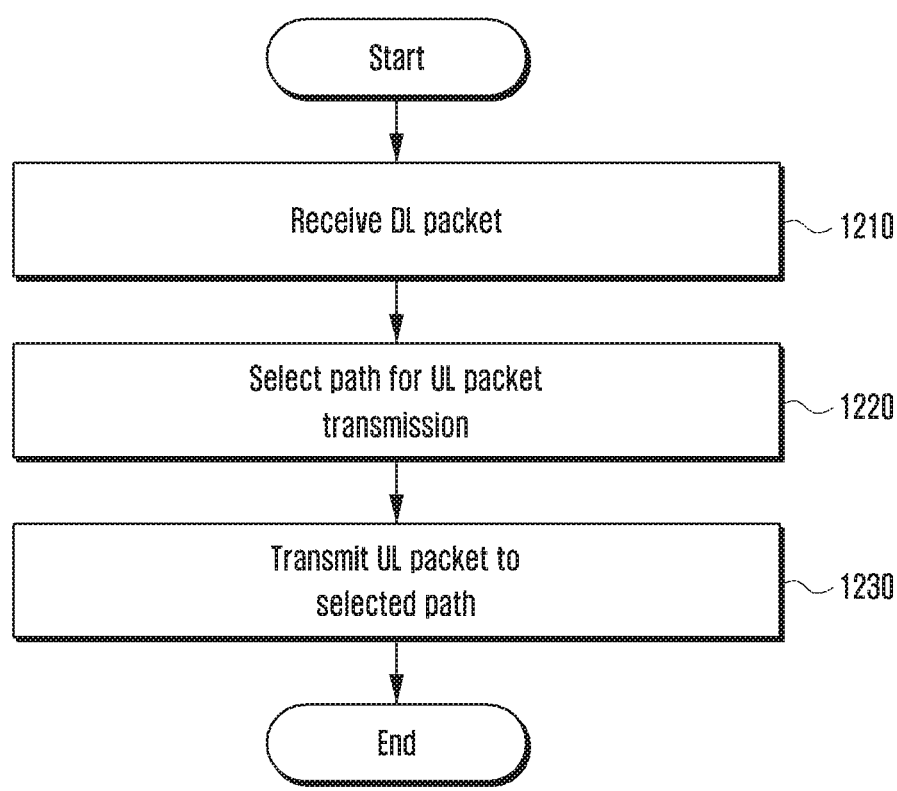
FIG. 12 is a flowchart illustrating an operation by a UE of selecting a transmission path according to an embodiment of the disclosure.

FIG. 12 is a flowchart illustrating an operation by a UE of selecting a transmission path according to an embodiment.

Referring to FIG. 12, an operation by a UE in the embodiment described in FIG. 11 is illustrated. As described above, the CU and the DU may be understood as a node of a base station or a node on a network, respectively, and additionally, the CU and the DU together configure a base station.

The UE receives a downlink packet transmitted from any one of the two base stations involved in DC (indicated by reference numeral 1210). Subsequently, the UE selects a path for transmission of an uplink packet corresponding to the downlink packet (indicated by reference numeral 1220). The PDCP of the UE may transmit an uplink packet for a split bearer through one of two base stations (MN and SN). At this time, the UE may select the transmission path of the uplink packet to be the same as the path of the previously received downlink packet according to the embodiments described above.

Subsequently, the UE transmits the uplink packet to the base station through the selected path (indicated by reference numeral 1230).

Figure 13:
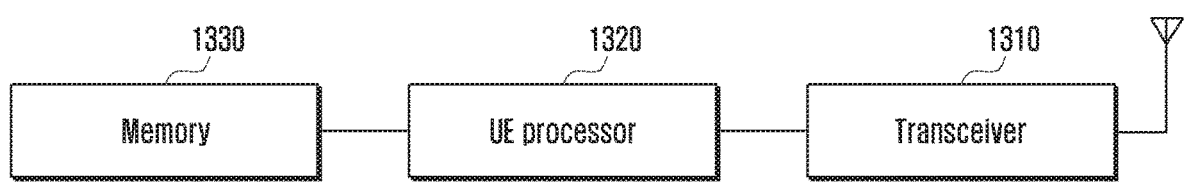
FIG. 13 illustrates a structure of a terminal according to an embodiment of the disclosure.

FIG. 13 illustrates a structure of a UE according to an embodiment of the disclosure.

Referring to FIG. 13, a UE according to embodiments described above includes a transceiver 1310, at least one UE processor 1320, and a memory 1330. The UE may be implemented to include a greater or smaller number of elements than the illustrated elements of FIG. 13.

The transceiver 1310 transmits or receives signals to or from another UE, a base station, and/or a network entity. The transceiver 1310 may receive, for example, a downlink packet from a base station, and may transmit an uplink packet to the base station.

The UE processor 1320 may control the overall operations of the UE according to embodiments. For example, the UE processor 1320 may control the transceiver 1310 and the memory 1330 so as to select a transmission path and transmit data packets through the selected path.

The memory 1330 may store information, data, programs, instructions, and the like, which are processed by the UE.

Figure 14:
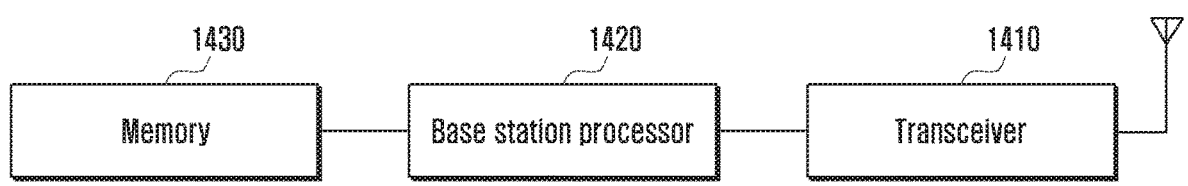
FIG. 14 illustrates a structure of a base station according to an embodiment of the disclosure.

FIG. 14 illustrates a structure of a base station according to an embodiment of the disclosure.

The structure of a base station illustrated in FIG. 14 shows a structure for an MN or SN involved in DC, and may be a structure including both a host node and a corresponding node for data transmission and reception between a CU and a DU.

Referring to FIG. 14, the base station according to embodiments described above includes a transceiver 1410, at least one base station processor 1420, and a memory 1430. The base station may be implemented to include a greater or smaller number of elements than the illustrated elements of FIG. 14.

The transceiver 1410 transmits or receives signals to or from a UE, another base station, and/or a network entity. The transceiver 1410 may receive, for example, an uplink packet from a UE, and may transmit a downlink packet to the UE.

The base station processor 1420 may control the overall operations of the base station according to embodiments. For example, the base station processor 1420 may control the transceiver 1410 and the memory 1430 so as to select a transmission path and transmit data packets through the selected path.

The memory 1430 may store information, data, programs, instructions, and the like, which are processed by the base station.

The embodiments of the disclosure described and shown in the specification and the drawings have been presented to explain the technical contents of the disclosure and help in understanding the disclosure, and are not intended to limit the scope of the disclosure. In addition, it will be obvious that one or more of the above embodiments or parts thereof may be employed in combination. Further, an order of the description does not necessarily correspond to an order in which operations of each method are performed, and the order relationship between the operations may be changed or the operations may be performed in parallel.

While the disclosure has been shown and described with reference to various embodiments thereof, it will be understood by those skilled in the art that various changes in form and detail may be made therein without departing from the spirit and scope of the disclosure as defined by the appended claims and their equivalents.

What is claimed is:

1. A method for determining a transmission path of a packet by a base station in a wireless communication system, the method comprising:
    receiving an uplink packet from a terminal;
    configuring a flag for path selection in case that the uplink packet is received;
    selecting, based on a value of the flag, a path for transmitting a downlink packet from among a plurality of paths configured for the terminal;
    transmitting the downlink packet to the terminal through the selected path; and
    reconfiguring the value of the flag in case that the downlink packet is transmitted.

2. The method of claim 1, wherein the plurality of paths comprises:
    a first path comprising a master node (MN) of dual connectivity (DC) configured for the terminal, and
    a second path comprising a secondary node (SN) of the dual connectivity.

3. The method of claim 1, further comprising transmitting the downlink packet from a host node of a packet data convergence protocol (PDCP) supporting a split bearer to the terminal through a corresponding node of the selected path.

4. The method of claim 1, wherein the uplink packet and the downlink packet are configured as a pair of packets and comprise at least one of a ping request packet, a ping response packet, a transmission control protocol (TCP) 3-way handshake packet, or a stop-and-wait protocol packet.

5. A base station for determining a transmission path of a packet in a wireless communication system, the base station comprising:
    a transceiver configured to transmit or receive a signal; and
    a controller configured to:
        receive an uplink packet from a terminal,
        configure a flag for path selection in case that the uplink packet is received, select, based on a value of the flag, a path for transmitting a downlink packet from among a plurality of paths configured for the terminal, transmit the downlink packet to the terminal through the selected path, and reconfigure the value of the flag in case that the downlink packet is transmitted.

6. The base station of claim 5, wherein the plurality of paths comprise:

a first path comprising a master node (MN) of dual connectivity (DC) configured for the terminal; and a second path comprising a secondary node (SN) of the dual connectivity.

7. The base station of claim 5, wherein the controller is further configured to transmit the downlink packet from a host node of a packet data convergence protocol (PDCP) supporting a split bearer to the terminal through a corresponding node of the selected path.

8. The base station of claim 5, wherein the uplink packet and the downlink packet are configured as a pair of packets and comprise at least one of a ping request packet, a ping response packet, a transmission control protocol (TCP) 3-way handshake packet, or a stop-and-wait protocol packet.

9. A method for determining a transmission path of a packet by a terminal in a wireless communication system, the method comprising:

receiving a downlink packet from a base station;

configuring a flag for path selection in case that the downlink packet is received;

selecting, based on a value of the flag, a path for transmitting an uplink packet from among a plurality of paths configured for the terminal;

transmitting the uplink packet to the base station through the selected path; and reconfiguring the value of the flag in case that the uplink packet is transmitted.

10. The method of claim 9, wherein the plurality of paths comprise:

a first path comprising a master node (MN) of dual connectivity (DC) configured for the terminal, and a second path comprising a secondary node (SN) of the dual connectivity.

11. The method of claim 9, further comprising transmitting the uplink packet from a corresponding node of the selected path to a host node of a packet data convergence protocol (PDCP) supporting a split bearer.

12. The method of claim 9, wherein the uplink packet and the downlink packet are configured as a pair of packets and comprise at least one of a ping request packet, a ping response packet, a transmission control protocol (TCP) 3-way handshake packet, or a stop-and-wait protocol packet.

13. A terminal for determining a transmission path of a packet in a wireless communication system, the terminal comprising:

a transceiver configured to transmit or receive a signal; and a controller configured to:

receive a downlink packet from a base station, configure a flag for path selection in case that the downlink packet is received, select, based on a value of the flag, a path for transmitting an uplink packet from among a plurality of paths configured for the terminal, transmit the uplink packet to the base station through the selected path, and reconfigure the value of the flag in case that the uplink packet is transmitted.

14. The terminal of claim 13, wherein the plurality of paths comprise:

a first path comprising a master node (MN) of dual connectivity (DC) configured for the terminal; and a second path comprising a secondary node (SN) of the dual connectivity.

15. The terminal of claim 13, wherein the controller is further configured to transmit the uplink packet from a corresponding node of the selected path to a host node of a packet data convergence protocol (PDCP) supporting a split bearer.

16. The terminal of claim 13, wherein the uplink packet and the downlink packet are configured as a pair of packets and comprise at least one of a ping request packet, a ping response packet, a transmission control protocol (TCP) 3-way handshake packet, or a stop-and-wait protocol packet.

\* \* \* \* \*